US008072503B2

(12) United States Patent
Tischer (10) Patent No.: US 8,072,503 B2
(45) Date of Patent: Dec. 6, 2011

(54) METHODS, APPARATUSES, SYSTEMS, AND COMPUTER PROGRAM PRODUCTS FOR REAL-TIME HIGH DYNAMIC RANGE IMAGING

(75) Inventor: Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1075 days.

(21) Appl. No.: 11/876,907

(22) Filed: Oct. 23, 2007

(65) Prior Publication Data

US 2009/0102946 A1 Apr. 23, 2009

(51) Int. Cl.
*H04N 5/225* (2006.01)
*H04N 9/097* (2006.01)
*H04N 9/47* (2006.01)
*G03B 35/00* (2006.01)

(52) U.S. Cl. .......... 348/218.1; 348/207.1; 348/159; 348/47; 396/325

(58) Field of Classification Search ............ 348/46–48, 348/218.1, 207.1, 159; 396/325
See application file for complete search history.

(56) References Cited

U.S. PATENT DOCUMENTS

| | | |
|---|---|---|
| 4,870,700 A | 9/1989 | Ormanns et al. |
| 5,680,441 A | 10/1997 | Gallo |
| 5,926,101 A | 7/1999 | Dasgupta |
| 6,697,103 B1 | 2/2004 | Fernandez et al. |
| 6,809,760 B1 | 10/2004 | Takagi et al. |
| 6,947,071 B2 | 9/2005 | Eichmann |
| 6,956,614 B1 | 10/2005 | Quintana et al. |
| 7,079,176 B1 | 7/2006 | Freeman et al. |
| 7,266,396 B2 | 9/2007 | Terzian et al. |
| 7,321,387 B2 | 1/2008 | Novais et al. |
| 7,323,991 B1 | 1/2008 | Eckert et al. |
| 7,370,077 B2 | 5/2008 | Pradhan et al. |
| 7,382,798 B2 | 6/2008 | Sugaya |
| 7,426,197 B2 | 9/2008 | Schotten et al. |
| 7,501,934 B2 | 3/2009 | Tischer |
| 2001/0026552 A1 | 10/2001 | Spratt et al. |
| 2001/0045978 A1 | 11/2001 | McConnell et al. |
| 2002/0009971 A1 | 1/2002 | Spratt |
| 2002/0039135 A1 | 4/2002 | Heyden |
| 2002/0093493 A1 | 7/2002 | Michaeli et al. |
| 2003/0009397 A1 | 1/2003 | Whitenack et al. |
| 2003/0093797 A1 | 5/2003 | Bazzaz |
| 2003/0097397 A1 | 5/2003 | Giannetti |
| 2003/0117316 A1 | 6/2003 | Tischer |
| 2004/0029582 A1 | 2/2004 | Swab et al. |
| 2004/0074448 A1 | 4/2004 | Bunt et al. |
| 2004/0125230 A1* | 7/2004 | Suda ..................... 348/345 |
| 2004/0156616 A1 | 8/2004 | Strub et al. |
| 2004/0246333 A1* | 12/2004 | Steuart, III ................ 348/36 |

(Continued)

*Primary Examiner* — David Ometz
*Assistant Examiner* — Quang Le
(74) *Attorney, Agent, or Firm* — Cantor Colburn LLP (57) ABSTRACT

Methods, apparatuses, systems, and computer program products for real-time high dynamic range (HDR) imaging are provided. A method includes creating a first HDR image file for a subject image captured from a first angle and at a first time increment (T1). The first HDR image file is created by a first image capturing device. The method also includes receiving a second HDR image file for the subject image captured from a second angle at T1, creating a first composite HDR image file by combining elements of the first HDR image file with elements of the second HDR image file, and generating a first three-dimensional HDR image from the composite HDR image file. The second HDR image file is received in real-time, such that the first three-dimensional HDR image reflects the subject at T1.

12 Claims, 6 Drawing Sheets

U.S. PATENT DOCUMENTS

| | | |
|---|---|---|
| 2005/0135286 A1 | 6/2005 | Nurminen et al. |
| 2005/0188399 A1 | 8/2005 | Tischer |
| 2006/0046719 A1 | 3/2006 | Holtschneider |
| 2006/0062175 A1 | 3/2006 | Ling et al. |
| 2006/0074645 A1 | 4/2006 | Tischer |
| 2006/0128447 A1 | 6/2006 | Tischer et al. |
| 2006/0209744 A1 | 9/2006 | Tischer |
| 2008/0252485 A1 | 10/2008 | Lagassey |

* cited by examiner

METHODS, APPARATUSES, SYSTEMS, AND COMPUTER PROGRAM PRODUCTS FOR REAL-TIME HIGH DYNAMIC RANGE IMAGING

BACKGROUND OF THE INVENTION

Exemplary embodiments relate generally to digital imaging, and more particularly, to methods, apparatuses, systems, and computer program products for real-time high dynamic range imaging.

Imaging capturing devices, such as digital cameras, generally rely upon commercial or open-source software for producing high dynamic range (HDR) images. HDR refers to a process for adjusting luminance and chrominance of an image to approximate how the image is perceived by the human eye. The resultant images of limited dynamic range are additively combined into a single instance that yields a single high contrast image computationally created with detail in highlight and shadow areas. This image can be tailored to better represent the scene as originally seen by the eye, even using limited, current output devices. HDR technology involves capturing multiple consecutive instances (e.g., brackets) of an image, whereby each instance is exposed for varying degrees of light and for varying depths of field. Selected portions of each instance are combined to form a single image. These portions may be selected by processing the information in each of the image files and determining areas of the images in which the exposure level and focus depth approximate what would be perceived by the human eye. Not surprisingly, the process of HDR imaging requires a great deal of memory and processing power due, in part, to the number of brackets or exposures required for a single image, rendering this technology unsuitable for use on small, portable devices. Thus, this type of software is utilized on larger computer devices (e.g., general desktop computers) having greater capacity in terms of storage.

Oftentimes, these HDR images are electronically shared among friends and family over a network, using personal communications channels or commercial websites, such as Snapfish® and Flickr®. In this instance, a user is required to upload the images to a personal computer and process the images into HDR images using the selected software before transmitting the images to a desired destination.

In addition, portable digital imaging devices do not provide expanded HDR technology, such as providing three-dimensional HDR images, 3D HDR video, and collaborative creation of 3D HDR images and video among multiple image capturing devices.

What is needed, therefore, is a way to provide enhanced HDR services to portable image capturing devices.

BRIEF SUMMARY OF THE INVENTION

Exemplary embodiments include methods for real-time high dynamic range (HDR) imaging. A method includes creating a first HDR image file for a subject image captured from a first angle and at a first time increment (T1). The first HDR image file is created by a first image capturing device. The method also includes receiving a second HDR image file for the subject image captured from a second angle at T1, creating a first composite HDR image file by combining elements of the first HDR image file with elements of the second HDR image file, and generating a first three-dimensional HDR image from the composite HDR image file. The second HDR image file is received in real-time, such that the first three-dimensional HDR image reflects the subject at T1.

Additional exemplary embodiments include an image capturing device for real-time high dynamic range (HDR) imaging. The image capturing device includes a sensor array; memory; a liquid lens; a filter; an input/output component for initiating an image capture; a communications component; a computer processor in communication with the sensor array, memory, liquid lens, filter and input/output component; and an HDR imaging application executing on the computer processor. The HDR imaging application implements a method. The method includes creating a first HDR image file for a subject captured from a first angle and at a first time increment (T1). The first HDR image file is created by the image capturing device. The method also includes receiving a second HDR image file for the subject image captured from a second angle at T1, creating a first composite HDR image file by combining elements of the first HDR image file with elements of the second HDR image file, and generating a first three-dimensional HDR image from the composite HDR image file. The second HDR image file is received in real-time, such that the first three-dimensional HDR image reflects the subject at T1.

Further exemplary embodiments include computer program products for real-time high dynamic range (HDR) imaging. A computer program product includes instructions for causing a computer to implement a method. The method includes creating a first HDR image file for a subject image captured from a first angle and at a first time increment (T1). The first HDR image file is created by a first image capturing device. The method also includes receiving a second HDR image file for the subject image captured from a second angle at T1, creating a first composite HDR image file by combining elements of the first HDR image file with elements of the second HDR image file, and generating a first three-dimensional HDR image from the composite HDR image file. The second HDR image file is received in real-time, such that the first three-dimensional HDR image reflects the subject at T1.

Further exemplary embodiments include methods for providing centralized management of high dynamic range (HDR) image files. A method includes receiving a first composite HDR file having combined elements of a first HDR image file and a second HDR image file. The combined elements form a first three-dimensional HDR image of a subject. The method also includes receiving an identifier for the first composite HDR image file. The identifier identifies a first image capturing device associated with the first composite HDR image file. The method also includes storing the identifier and the first composite HDR image file in a database record. The database record includes authorization settings specifying access permissions. The method further includes providing authorized entities with access to the first composite HDR image file based upon the access permissions.

Further exemplary embodiments include systems for providing centralized management of high dynamic range (HDR) image files. A system includes a host system and an HDR image management application executing on the host system. The HDR image management application performs a method. The method includes receiving a first composite HDR file having combined elements of a first HDR image file and a second HDR image file. The combined elements form a first three-dimensional HDR image of a subject. The method also includes receiving an identifier for the first composite HDR image file. The identifier identifies a first image capturing device associated with the first composite HDR image file. The method also includes storing the identifier and the first composite HDR image file in a database record. The database record includes authorization settings specifying access permissions. The method further includes providing authorized entities with access to the first composite HDR image file based upon the access permissions.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Real-time high dynamic range (HDR) imaging methods, apparatuses, and computer program products are provided in exemplary embodiments. In one exemplary embodiment, an image capturing device includes features for enabling the generation, delivery, and management of HDR imaging, such as three-dimensional HDR images and HDR motion video. In an alternative exemplary embodiment, a host system may provide centralized management of the real-time HDR imaging processes described further in FIGS. 5 and 6.

Figure 1:
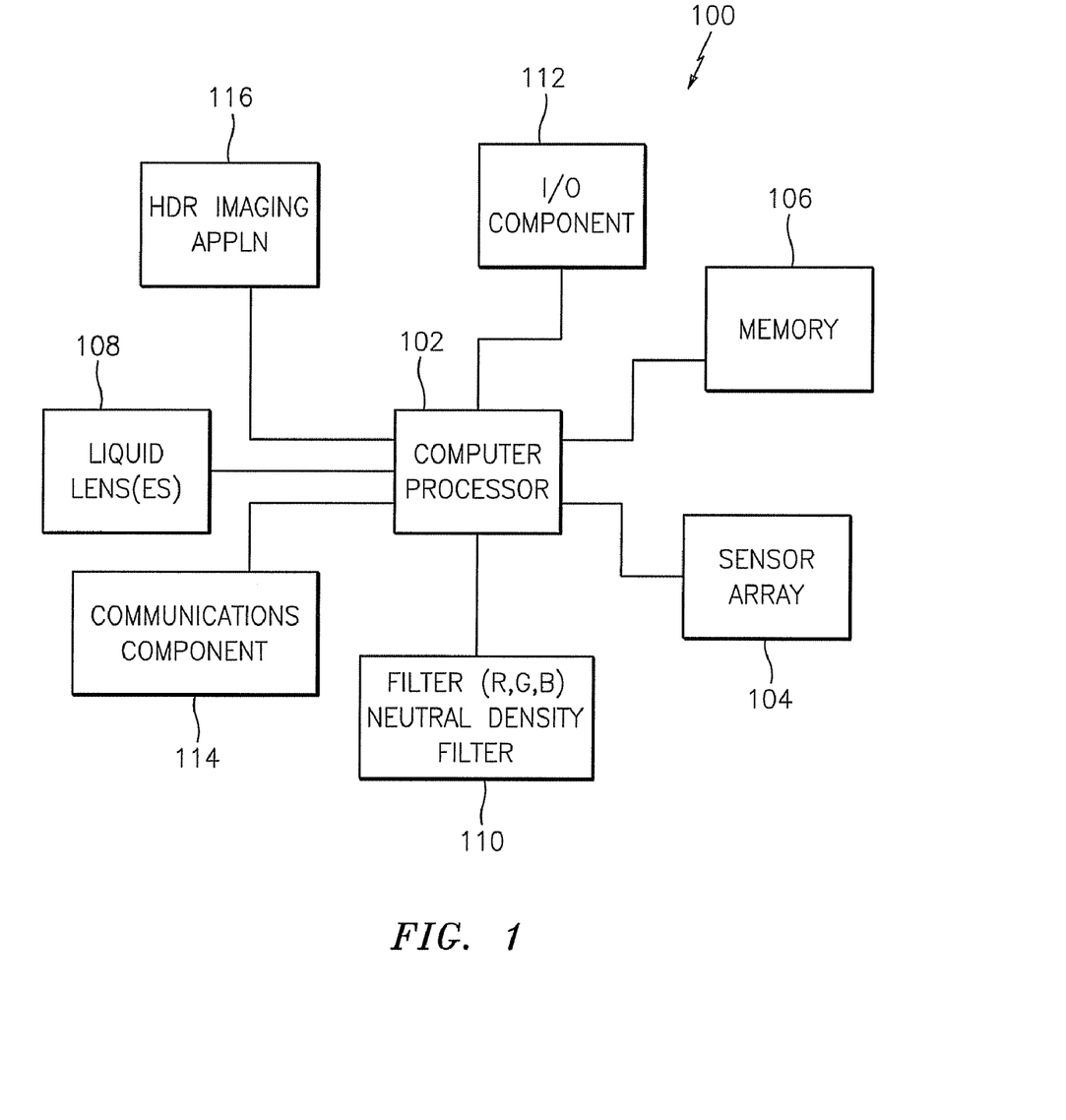
FIG. 1 is an image capturing device for implementing real-time, high dynamic range image capture in accordance with exemplary embodiments.

Referring now to FIG. 1, an image capturing device 100 will now be described in exemplary embodiments. The image capturing device 100 of FIG. 1 includes a computer processor 102, a sensor array 104, physical memory 106, one or more liquid lenses 108, one or more filters 110, an input/output component 112 for initiating an image capture, and a communications component 114. The computer processor 102 is in communication with the sensor array 104, memory 106, the liquid lens(es) 108, the filter(s) 110, the input/output component 112, and the communications component 114. The image capturing device 100 also includes an HDR imaging application 116 executing on the computer processor 102. In exemplary embodiments, the computer processor 102 executes the HDR imaging application 116 for facilitating the real-time HDR imaging processes described herein. The computer processor 102 may include multi-core processing units for providing high-speed, real-time processing of image files captured by the device 100.

In exemplary embodiments, the communications component 114 is configured to transmit communication signals (e.g., via a transmitter), including processed HDR image files and composite HDR image files as described herein. An authorization requirement associated with the HDR image files and composite HDR image files may be established for restricting the transmission of these files to authorized entities. In exemplary embodiments, the communications component 114 is configured to transmit the HDR image files, composite HDR image files, as well authorization requirements established for a receiving device in real time over one or more networks.

Likewise, the communications component 114 may include a receiver element configured to receive HDR image files and composite HDR image files from a sending device.

In exemplary embodiments, the communications component 114 may include a signal detection element configured to detect peer devices within a proximity range of the image capturing device 100. The signal detection component may be implemented, e.g., via a communications device, such as the device described in U.S. patent application Ser. No. 10/785,914, filed on Feb. 24, 2004, entitled METHODS, SYSTEMS, AND STORAGE MEDIUMS FOR PROVIDING MULTI-VIEWPOINT MEDIA SHARING OF PROXIMITY-CENTRIC CONTENT, and which is commonly assigned to the assignees of the instant application, the disclosure of which is incorporated by reference herein in its entirety.

The input/output components 112 may include a controller for initiating an image capture and a display screen (e.g., LCD or OLED) for displaying images captured by the device 100. Other input/output elements may also be implemented, such as, e.g., a keyboard and data entry device.

The liquid lenses 108 control the depth or focal point of an image to provide depth perception. The liquid lenses 108 may be electronically controlled via the HDR imaging application 116 in order to provide real-time rapid image capture (e.g., bracketing of images). The RGB filter 110 provides elements for capturing color and contrast for an image. The sensor array 104 may comprise a CMOS or CCD chip for emitting electrical impulses in response to receiving light. The sensor array 104 may also include an optical image stabilizer for sensing motion and providing adjustments that compensate for the motion with respect to an image capture. The memory 106 stores digital image data translated in response to the electrical impulses emitted by the sensor array 104. The memory 106 may also store image files, HDR image files, composite HDR image files, and HDR video as described further herein. The memory 106 and sensor array 104 may be implemented as a RAID array for storing high bit-depth images created by the real-time HDR image capturing processes. In addition, the memory 106 may be a high-capacity storage system that provides, e.g., a terabyte of storage.

The HDR imaging application 116 processes the digital image data from the memory 106 to produce image files, HDR image files, composite HDR image files, and HDR videos. The HDR imaging application 116 may include various features found in off-the-shelf products, such as a 32-bit depth file format, histograms, and tonal mapping functions that assist in producing and processing an HDR image file. The HDR imaging application 116 processes these HDR image files, as well as HDR image files received from external devices to create three-dimensional HDR images and HDR video as described further herein.

The HDR imaging application 116 may include a user interface configurable via the application to display the HDR images, alter configuration settings related to the image capturing device 100, and to be responsive to user input. In addition, the image capturing device 100 may be configured to enable a user to enter an address of a receiving device, via the user interface for restricting access to images. As indicated above, the HDR imaging application 116 may also include a discovery feature for enabling the user to detect image capturing devices in close proximity.

It will be understood that the image capturing device 100 may include digital imaging mechanical elements for providing aperture, shutter speed, ISO, and error correction information. Some of the image data (e.g., luminance) is received at the sensor array 104, while other image data (e.g., chrominance, or color data) is processed via the filter 110. The filter 110 may be a neutral density filter. In addition, focus and depth information for a subject image is managed by the liquid lens(es) 108, which provides high-speed focusing capabilities.

Figure 2A:
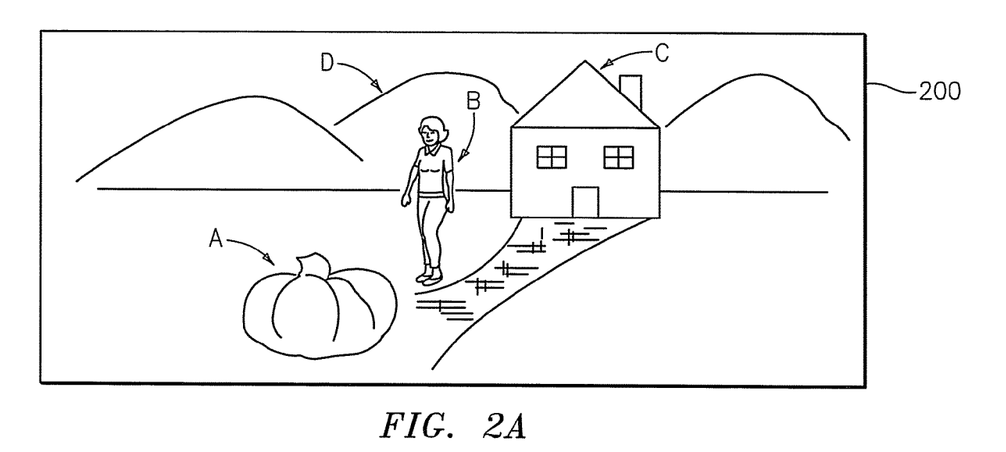
FIG. 2A is a perspective view illustrating elements of a subject image.
Figure 2B:
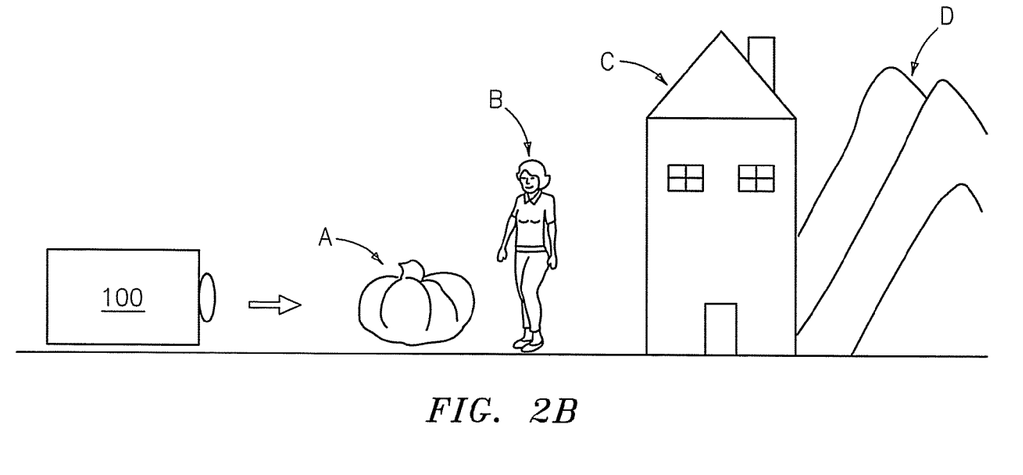
FIG. 2B is a cross-view of the subject image depicted in FIG. 2A.

In exemplary embodiments, an image file is created by the image capturing device 100. The subject image may include elements that differ in luminance, chrominance, depth of field, etc. As shown in FIG. 2A, e.g., a subject image 200 includes four primary elements A-D having four different depths of field. FIG. 2B is a cross-view of the subject image 200 of FIG. 2A and illustrates the varying depths of field of the elements A-D. While not shown in FIG. 2A, each of these elements A-D may have varying degrees of luminance and chrominance. For example, element A may provide more tonal detail as it is located in the foreground of the subject image, while element D may provide less detail and may be darker than the elements A-C. This may be due, in part, to the contrast between a bright sky above the mountains of the element D. The HDR imaging application 116 creates a first image file of the subject image 200 by exposing the subject image 200 for varying shutter speeds and focal depths. For example, the image capturing device 100 may focus, expose, and capture multiple instances of the subject image 200, which results in instances that reflect varying degrees of under-exposed elements, over-exposed elements, and elements with light intensity levels and contrast ratios that substantially approximate that which would be seen by the human eye. Any number of exposures may be used depending upon the number and intensity of the light levels and contrast ratios of each of the elements in the subject image 200. These image files are then used to create HDR image files, 3D HDR images, and HDR motion video as will now be described in FIGS. 3 and 4.

Figure 3:
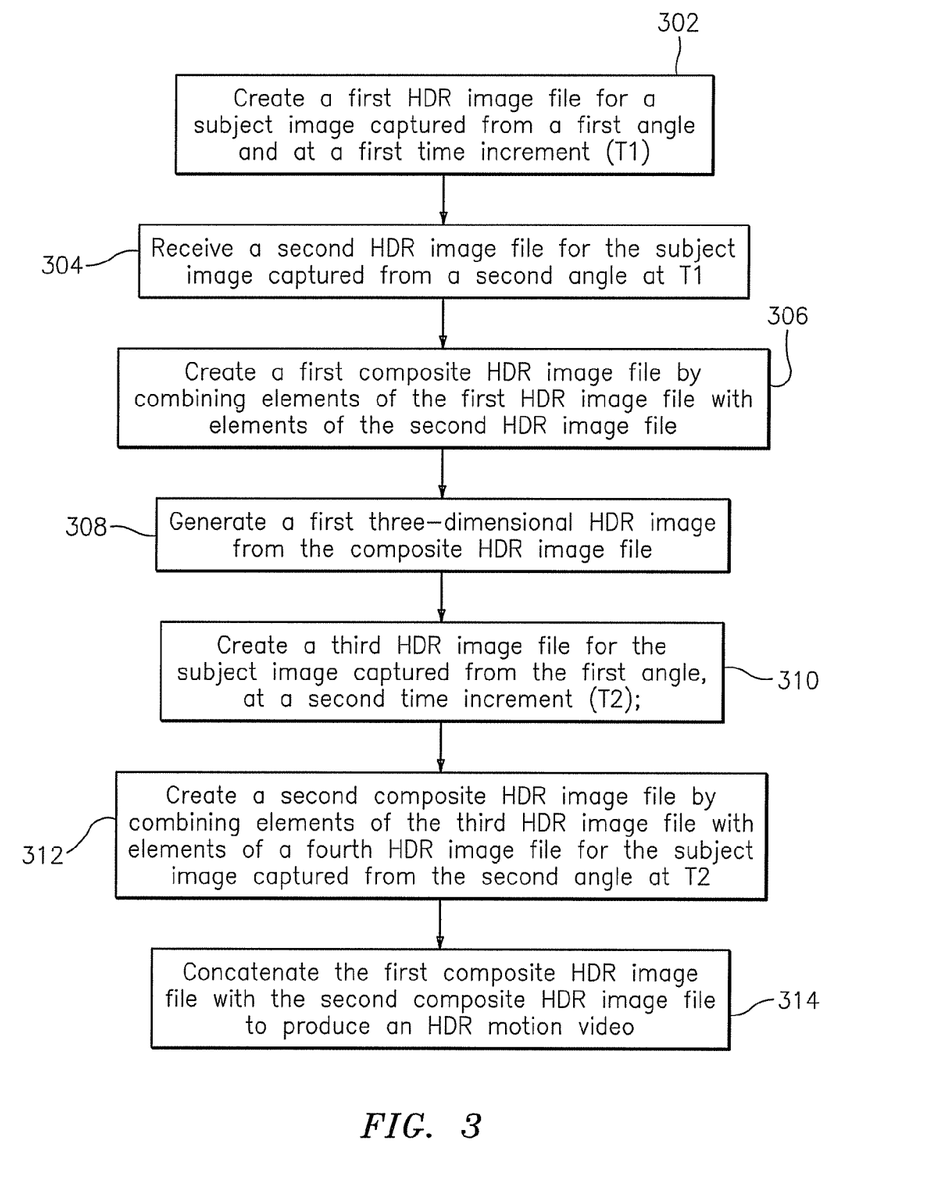
FIG. 3 is flow diagram describing a process for implementing real-time high dynamic range image capturing in accordance with exemplary embodiments.

Turning now to FIG. 3, a process for implementing the real-time HDR imaging processes will now be described in exemplary embodiments. A composite HDR image file and component constituent files are described in FIG. 4.

Figure 4:
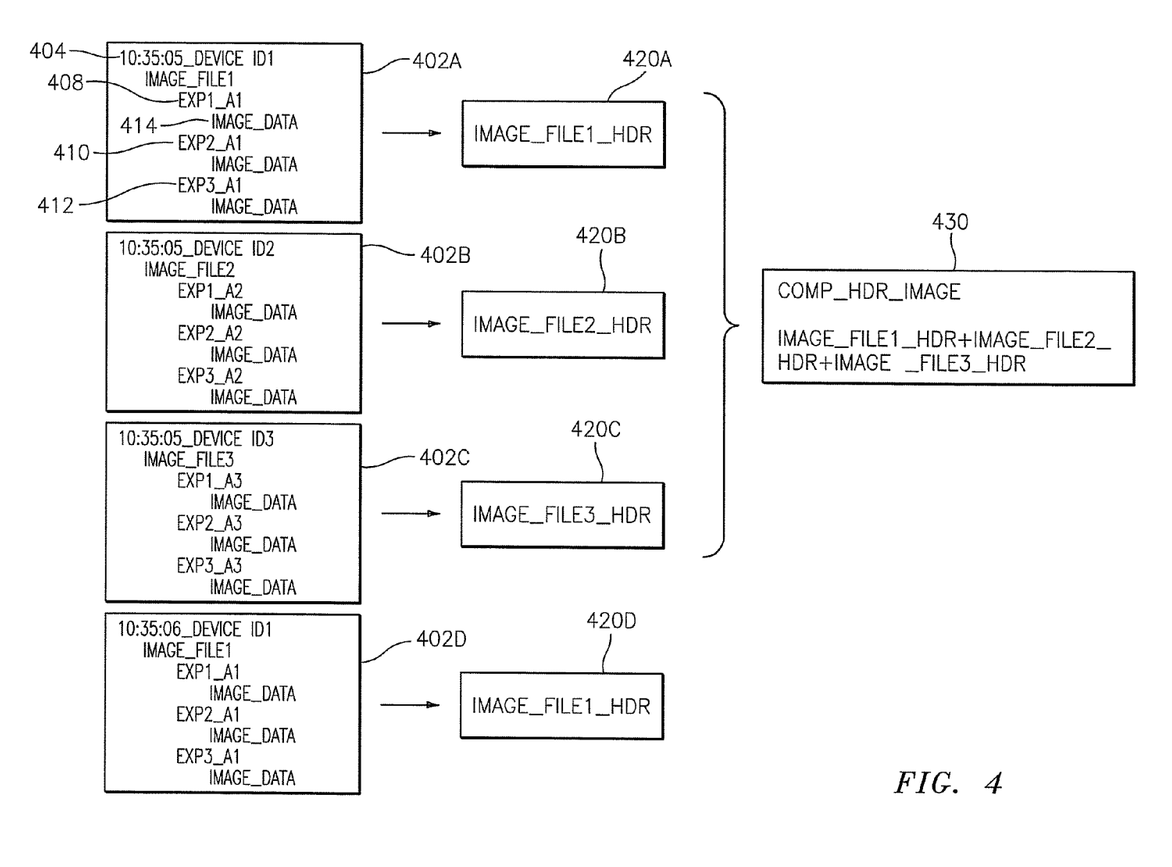
FIG. 4 is a composite high dynamic range image file and constituent component files generated via real-time high dynamic range image capture and processing functions in accordance with exemplary embodiments.

At step 302, a first HDR image file 420A for a subject image is captured from a first angle and at a first time increment (T1). The first HDR image file 420A is created by a first image capturing device (e.g., the image capturing device 100) by exposing the subject image for varying light intensity levels, contrast ratios, and varying depths of field. A sample image file 402A resulting from the multiple exposures is shown in FIG. 4. As shown in FIG. 4, each of the image files 402A-402D provide information including, e.g., a timestamp of the image capture and device identifier 404, the image file exposures 408, 410, and 412 (representing three exposures), which includes image data 414, such as shutter speed, ISO, aperture, and error correction data to name a few. The HDR imaging application 116 creates the HDR image file 420A from the data in the image file 402A. In exemplary embodiments, the HDR imaging application 116 produces a histogram from the data that details concentrations of over-exposed and under-exposed elements and adjusts the subject image captured via an algorithm that selects the elements from each exposure in which light levels and contrast ratios approximate that would been seen by the human eye (e.g., averaging or normalizing the data provided in the histogram to adjust the light and contrast features of the elements.

At step 304, a second HDR image file 420B is received at the first image capturing device 100 for the subject, which is captured from a second angle at T1 and transmitted to, and received by, the image capturing device 110 at T1. For example, the second image capturing device may be situated at a 15 degree angle from the first image capturing device 100 with respect to the subject image (which is used herein as the reference plane). The second HDR image file 420B is created and transmitted to the first imaging device 100 by a second image capturing device via, e.g., a discovery feature on the image capturing device 100 as described above. The second HDR image file 420B is received in real-time, such that the composite HDR image file 430 reflects the subject image at T1.

At step 306, a first composite HDR image file 430 is created by combining elements of the first HDR image file 420A with elements of the second HDR image file 420B, and a third HRD image file 420C. As shown in FIG. 4, each of the three HDR images 420A-420C has been produced by three separate image capturing devices at a first time increment (i.e., simultaneously at T1). This is reflected in image files 402A-402C by the field 10:35:05_DEVICEID1, 10:35:05_DEVICEID2, and 10:35:05_DEVICE_ID3. The elements may be combined using stereoscopic techniques and may further include processing the image file data (IMAGE_DATA) to determine shadowing, highlighting, angular detail representing the different points of view of the subject image, as well as other differentiations among the image files 402A-402C, as reflected in corresponding HDR image files 420A-420C, which can be used to modify portions or elements of the constituent HDR image files 420A-420C to produce a three-dimensional HDR image. The angular information is reflected in image files 402A-402D by the fields 408, 410, and 412 (e.g., EXP1_A1).

At step 308, a first three-dimensional HDR image is generated from the composite HDR image file 430. The first three-dimensional HDR image 430 represents the visual representation of the data contained in composite HDR image file 430.

At step 310, a fourth HDR image file 420D for the subject image is created. Using the techniques described above, the fourth HDR image is captured by the first imaging device 100 from the first angle, at a second time increment (T2). At step 312, a second composite HDR image file may be created by combining elements of the fourth HDR image file 420D with elements of a fifth HDR image file (not shown) for the subject image captured by the second imaging device from the second angle at T2. At step 314, the first composite HDR image file 430 is concatenated with the second composite HDR image file (not shown) by the HDR imaging application 116 to produce an HDR motion video.

As indicated above, the HDR image files 420A-420D may be created by successively capturing multiple instances of the subject image at varying exposure levels and focal depths by the image capturing devices 100, such that each of the instances includes elements that are over-exposed, under-exposed, and elements having light intensity levels and contrast ratios substantially commensurate with real-life scenes. For each element, the HDR imaging application 116 may then select an instance from each of the multiple instances in which the element has an intensity level and contrast ratio that is substantially commensurate with real-life scenes (e.g., the instance having visual properties that mimic what would be seen by the human eye, whereby the human eye continuously adjusts for light/dark and depth of focus), according to exemplary embodiments. The selected instances are combined to form respective HDR image files as described above.

Figure 5:
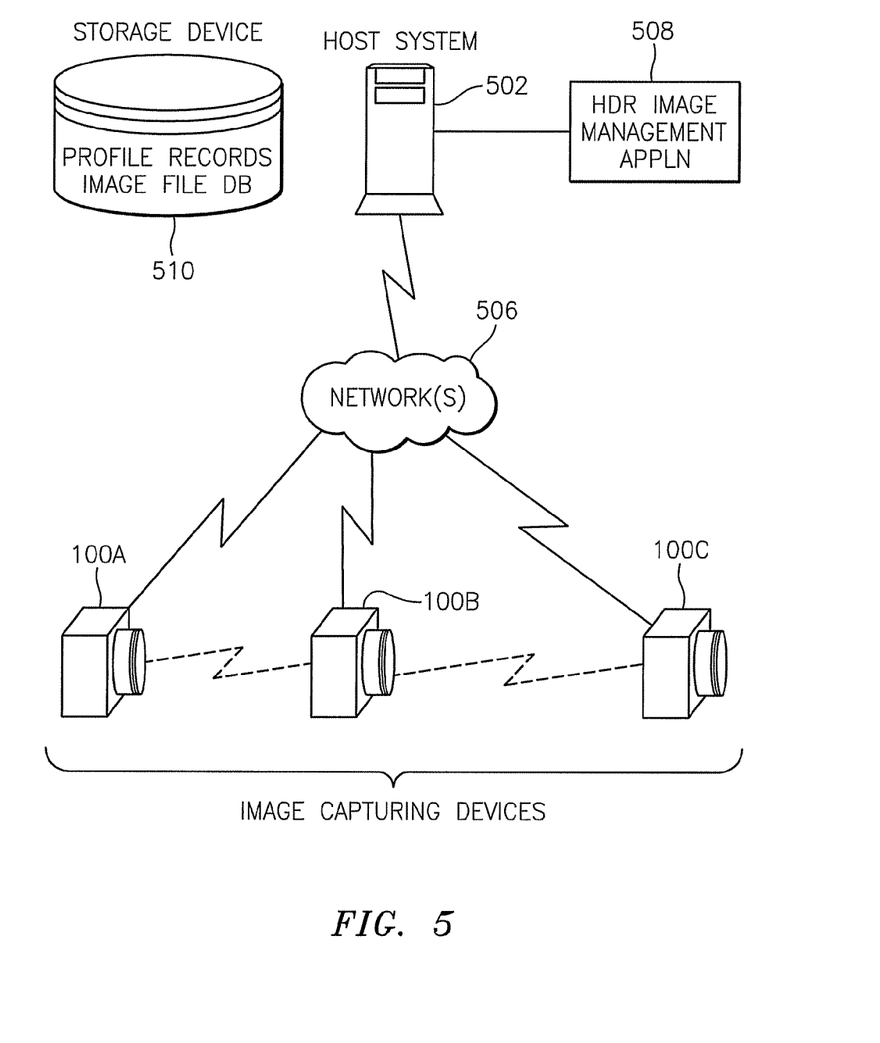
FIG. 5 is a block diagram describing a system upon which centralized management of real-time high dynamic range image capture may be implemented in exemplary embodiments.

As shown in FIG. 5, the sharing of HDR image files 420 may be implemented among multiple image capturing devices, such as the image capturing devices 100A-100C, via respective communications components. The sharing may occur using various types of networking techniques, e.g., wireless communications and transmissions protocols, such as personal communications service (PCS), WiFi, Ultrawideband, Bluetooth®, and satellite transmission, as well as different wireline protocols, such as telephone communications, cable communications and power line communications, to name a few.

In alternative exemplary embodiments, a centralized management system may be implemented for providing HDR image processing, storage and sharing functions. Turning now to FIG. 5, an exemplary system is provided for implementing centralized management of HDR image processing, storage and sharing functions. The system of FIG. 5 includes a host system 502 in communication with the image capturing devices 100A-100D over one or more networks 506. The host system 502 executes an HDR image management application 508 for providing the centralized management features as described herein.

The host system 502 may be implemented using a high-speed processing device (e.g., a computer system) that is capable of handling high volume activities conducted via users of the image capturing devices 100A-100C and other network entities. The host system 502 may be implemented by a network service provider, content service provider, or other enterprise.

The image capturing devices 100A-100C have been described in FIG. 1 with respect to the image capturing device 100. Thus, no further explanation will be provided. The image capturing devices 100A-100C may be in communication with one another via a peer-to-peer network using the discovery techniques described above and disclosed in U.S. patent application Ser. No. 10/785,914, or may be in communication via one or more networks 506.

It will be understood that the image capturing devices 100A-100C may be implemented as a standalone product or may be incorporated into one or more communications devices, such as cellular telephones and mobile computing devices, such as laptops or personal digital assistants, to name a few. In this embodiment, the networks 506 may include, e.g., a wireless cellular network, a wireless data network, and/or a satellite network.

The host system 502 is also in communication with a storage device 510. The storage device 510 includes a data repository for storing profile records and image files on behalf of users of the centralized HDR image management services. It is understood that the storage device 510 may be implemented using memory contained in the host system 502 or may be a separate physical device. Information stored in the storage device 510 may be retrieved and manipulated via the host system 502, image capturing devices 100A-100C, and/or other network entities (such as a personal desktop computer of a user of the centralized HDR management services.

In an exemplary embodiment, the storage device 510 stores profile records that are generated for each user of the centralized HDR management services. The users may be subscribers of the centralized HDR management services and/or may be authorized viewers of content stored in a subscriber's image files as described further herein.

Figure 6:
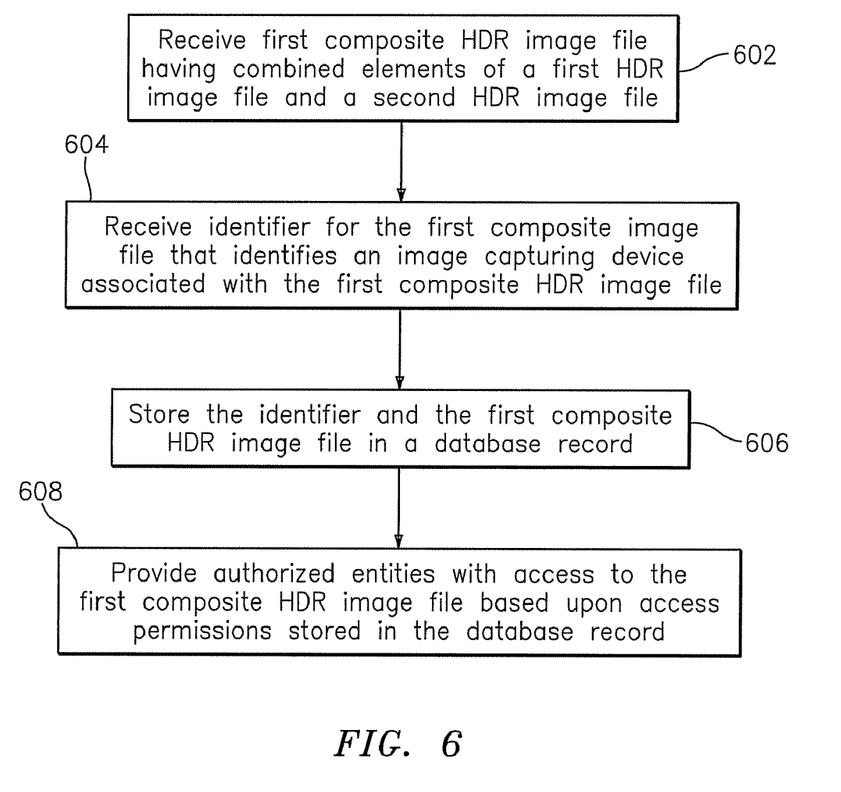
FIG. 6 is a flow diagram describing a process for implementing centralized management of real-time high dynamic range image capture in accordance with exemplary embodiments.

In exemplary embodiments, the centralized management of HDR image files includes receiving, storing, and processing HDR image files as will now be described in FIG. 6. Turning now to FIG. 6, a flow diagram describing a process for implementing the centralized management of HDR image files will now be described in accordance with exemplary embodiments.

At step 602, a first composite HDR image file (e.g., 430) for a subject image is received at the host system 502. The first composite HDR image file 430 reflects combined elements of a first HDR image (e.g., HDR image file 420A) and at least one additional HDR image file (e.g., HDR image file 420B). The HDR image files 420A and 420B reflect the subject image captured from first and second angles, respectively, and at a first time increment (T1). The first HDR image file is captured by a first image capturing device (e.g., device 100A).

At step 604, an identifier is received at the host system 502. The identifier identifies the subject image and the image capturing device 100A. For example, the identifier may be the data provided in the field 404 of the image file 402A shown in FIG. 4. In alternative exemplary embodiments, the identifier may be assigned by the HDR image management application 508.

At step 606, the identifier is stored in a database record (e.g., a profile record) in storage device 510, along with the first composite HDR image file 430. The profile record may include authorization settings that provide or restrict access to the image file database as desired by the entity associated with the profile record (e.g., owner). At step 608, the HDR image management application 508 processes requests to access the image file database, and provides access to those who have been validated using the authorization settings. In addition to composite HDR image files, a user may store one or more HDR image files and HDR motion video files in storage device 510. Likewise, access to these files may be implemented in the manner prescribed above. As a result, the HDR image management application 508 enables communities of individuals to share HDR image files, composite HDR image files, and HDR motion videos.

In addition to file storage and sharing, the HDR image management application 508 may include editing features that allow an authorized user to modify existing stored HDR image files, composite HDR image files, and HDR motion videos. For example, using the image data in image files 402A, a user may access a corresponding HDR image file (e.g., 420A), and modify the HDR image file 420A by combining elements thereof with an HDR image file of the user's preference (e.g., HDR image file 420B). In this manner, the composite HDR image file 430 is produced in response to actions taken by, e.g., a user of any authorized image capturing device.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for real time high dynamic range imaging, comprising:
    creating a first high dynamic range image file for a subject image captured from a first angle and at a first time increment, the first high dynamic range image file created by a first image capturing device and stored on the first image capturing device;
    receiving, at the first image capturing device over a communications network, a second high dynamic range image file for the subject image captured from a second angle at the first time increment, the second high dynamic range image file subject to an authorization requirement prior to the receiving;
    creating, by the first image capturing device, a first composite high dynamic range image file by combining elements of the first high dynamic range image file with elements of the second high dynamic range image file; and
    generating, by the first image capturing device, a first three-dimensional high dynamic range image from the composite high dynamic range image file;
    wherein the second high dynamic range image file is received in real time, such that the first three-dimensional high dynamic range image reflects the subject at the first time increment.

2. The method of claim 1, further comprising:
    creating a third high dynamic range image file for the subject image captured from the first angle, at a second time increment;
    creating a second composite high dynamic range image file by combining elements of the third high dynamic range image file with elements of a fourth high dynamic range image file for the subject image captured from the second angle at the second time increment; and
    concatenating the first composite high dynamic range image file with the second composite thigh dynamic range image file to produce a high dynamic range motion video.

3. The method of claim 2, further comprising:
    storing the high dynamic range motion video on the first image capturing device;
    wherein the second high dynamic range image file is received from a second image capturing device.

4. The method of claim 2, wherein the high dynamic range image files are created by:
    successively capturing multiple instances of the subject image at varying exposure levels, such that each of the instances includes elements that are over-exposed, under-exposed, and elements having light intensity levels and contrast ratios that substantially approximate the light intensity levels and contrast ratios seen by the human eye;
    for each of the elements, selecting an instance from each of the multiple instances in which the element has an intensity level and contrast ratio that substantially approximates the light intensity levels and contrast ratios seen by the human eye; and
    combining the selected instances to form the high dynamic range image file;
    wherein the selected instances are combined using data retrieved from the captured image, including date and time of the image capture, aperture, shutter speed, and error correction information; wherein the method further comprises:
    mapping the data among corresponding instances of the subject image.

5. An image capturing device for implementing high dynamic range imaging, the image capturing device comprising:
    a sensor array for receiving luminance data for a subject image;
    a liquid lens for managing focal depth of elements of the subject image;
    a filter for processing chrominance data for the subject image;
    a computer processor in communication with the sensor array, liquid lens, and the filter; and
    a high dynamic range imaging application executing on the computer processor, the high dynamic range imaging application implementing a method, comprising:
    receiving image data for the subject image from the sensor array, the filter, and the liquid lens, the image data including the luminance data, the focal depth, and the chrominance data;
    creating a first high dynamic range image file for the subject image using the image data, the subject image captured from a first angle and at a first time increment using the image data, the high dynamic range image file stored on the image capturing device;
    receiving, at the computer processor over a communications network, a second high dynamic range image file for the subject image, the subject image of the second high dynamic range file captured from a second angle at the first time increment the second high dynamic range image file subject to an authorization requirement prior to the receiving;
    creating a first composite high dynamic range image file by combining elements of the first high dynamic range image file with elements of the second high dynamic range image file; and generating a first three-dimensional high dynamic range image from the first composite high dynamic range image file;

wherein the second high dynamic range image file is received, such that the first three-dimensional high dynamic range image reflects the subject at the first time increment.

6. The image capturing device of claim 5, wherein the high dynamic range imaging application further implements:

creating a third high dynamic range image file for the subject image, the subject image of the third high dynamic range image file captured from the first angle, at a second time increment;

creating a second composite high dynamic range image file by combining elements of the third high dynamic range image file with elements of a fourth high dynamic range image file for the subject image, the subject image of the fourth high dynamic range image file captured from the second angle at the second time increment; and concatenating the first composite high dynamic range image file with the second composite high dynamic range image file to produce an high dynamic range motion video.

7. The image capturing device of claim 6, wherein the high dynamic range imaging application further implements:

storing the high dynamic range motion video on the first image capturing device;

wherein the second high dynamic range image file is received from a second image capturing device.

8. The image capturing device of claim 6, wherein the first and second high dynamic range image files are respectively created by:

successively capturing multiple instances of the subject image at varying exposure levels, such that each of the instances includes elements that are over-exposed, under-exposed, and elements having light intensity levels and contrast ratios that substantially approximate the light intensity levels and contrast ratios seen by the human eye;

for each of the elements, selecting an instance from each of the multiple instances in which the element has a light intensity level and contrast ratio that substantially approximates the light intensity level and contrast ratio seen by the human eye; and combining the selected instances to form respective first and second high dynamic range image files;

wherein the selected instances are combined using data retrieved from the captured image, including date and time of the image capture, aperture, shutter speed, and error correction information; wherein the method further comprises:

mapping the data among corresponding instances of the subject image.

9. A computer program product stored on a non-transitory computer readable storage medium for high dynamic range imaging, the computer program product including instructions for causing a computer to implement a method, comprising:

creating a first high dynamic range image file for a subject image captured from a first angle and at a first time increment, the first high dynamic range image file created by a first image capturing device and stored on the first image capturing device;

receiving, at the first image capturing device over a communications network, a second high dynamic range image file for the subject image captured from a second angle at the first time increment, the second high dynamic range image file subject to an authorization requirement prior to the receiving;

creating, by the first image capturing device, a first composite high dynamic range image file by combining elements of the first high dynamic range image file with elements of the second high dynamic range image file; and generating, by the first image capturing device, a first three-dimensional high dynamic range image from the composite high dynamic range image file;

wherein the second high dynamic range image file is received, such that the first three-dimensional high dynamic range image reflects the subject at the first time increment.

10. The computer program product of claim 9, further comprising instructions for performing:

creating a third high dynamic range image file for the subject image captured from the first angle, at a second time increment;

creating a second composite high dynamic range image file by combining elements of the third high dynamic range image file with elements of a fourth high dynamic range image file for the subject image captured from the second angle at the second time increment; and concatenating the first composite high dynamic range image file with the second composite high dynamic range image file to produce to produce a high dynamic range motion video.

11. The computer program product of claim 10, further comprising instructions for performing:

storing the high dynamic range motion video on the first image capturing device;

wherein the second high dynamic range image file is received from a second image capturing device.

12. The computer program product of claim 10, wherein the high dynamic range image files are created by:

successively capturing multiple instances of the subject at varying exposure levels, such that each of the instances includes elements that are over-exposed, under-exposed, and elements having light intensity levels and contrast ratios that substantially approximate the light intensity levels and the contrast ratios seen by the human eye;

for each of the elements, selecting an instance from each of the multiple instances in which the element has an intensity level and contrast ratio that is substantially approximate the light intensity level and the contrast ratio seen by the human eye; and combining the selected instances to form the high dynamic range image files;

wherein the selected instances are combined using data retrieved from the captured image, including date and time of the image capture, aperture, shutter speed, and error correction information; wherein the method further comprises:

mapping the data among corresponding instances of the subject image.

* * * * *